United States Patent
Okawa et al.

(10) Patent No.: US 8,808,869 B2
(45) Date of Patent: Aug. 19, 2014

(54) TREATMENT AGENT FOR USE IN LIGNOCELLULOSE MATERIAL

(75) Inventors: Tadashi Okawa, Ichihara (JP); Kazuhiro Nishijima, Chiba (JP)

(73) Assignee: Dow Corning Toray Co., Ltd., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/636,843

(22) PCT Filed: Mar. 25, 2011

(86) PCT No.: PCT/JP2011/058467
§ 371 (c)(1),
(2), (4) Date: Sep. 24, 2012

(87) PCT Pub. No.: WO2011/118858
PCT Pub. Date: Sep. 29, 2011

(65) Prior Publication Data
US 2013/0011686 A1    Jan. 10, 2013

(30) Foreign Application Priority Data

Mar. 26, 2010 (JP) .................................. 2010-071750

(51) Int. Cl.
*B32B 23/04* (2006.01)
(52) U.S. Cl.
USPC ........ 428/532; 428/536; 428/537.5; 427/392; 427/393; 524/588
(58) Field of Classification Search
USPC ............... 428/532, 536, 537.5; 427/392, 393; 524/588
See application file for complete search history.

(56) References Cited

U.S. PATENT DOCUMENTS

| | | | |
|---|---|---|---|
| 3,261,881 A | | 7/1966 | Christenson et al. |
| 3,770,687 A | * | 11/1973 | Mestetsky ..................... 524/588 |
| 3,823,025 A | * | 7/1974 | Mestetsky ..................... 428/352 |
| 3,855,052 A | * | 12/1974 | Mestetsky ..................... 428/352 |
| 6,916,507 B2 | | 7/2005 | Matsumura et al. |
| 8,188,266 B2 | | 5/2012 | Edelmann et al. |
| 8,481,654 B2 | | 7/2013 | Edelmann et al. |

FOREIGN PATENT DOCUMENTS

| | | | |
|---|---|---|---|
| CN | 1845975 A | | 10/2006 |
| CN | 101484517 A | | 7/2009 |
| JP | 2053859 | * | 2/1990 |
| JP | 2053859 A | | 2/1990 |
| JP | 5006481 B | | 1/1993 |
| JP | 07-150131 A | | 6/1995 |
| JP | 2002241744 A | | 8/2002 |

OTHER PUBLICATIONS

English language abstract for JP 2053859 extracted from the espacenet.com database on Dec. 12, 2012, 10 pages.
English language abstract for JP 5006481 extracted from the espacenet.com database on Dec. 12, 2012, 7 pages.
English language abstract and machine-assisted English translation for JP 07-150131 extracted from the PAJ database on Dec. 12, 2012, 34 pages.
English language abstract for JP 2002241744 extracted from the espacenet.com database on Dec. 12, 2012, 21 pages.
International Search Report for Application No. PCT/JP2011/058467 dated Dec. 1, 2011, 6 pages.
English language abstract not available for CN 1845975; however, see English language equivalent US 8,481,654. Original document extracted from the espacenet.com database on Mar. 12, 2014, 15 pages.
English language abstract for CN 101484517 extracted from the espacenet.com database on Mar. 12, 2014, 17 pages.

* cited by examiner

*Primary Examiner* — Leszek Kiliman
(74) *Attorney, Agent, or Firm* — Howard & Howard Attorneys PLLC

(57) ABSTRACT

An objective of the present invention is to provide a lignocellulose material exhibiting superior dimensional stability and having a reduced water-absorbing property, as well as provide a lignocellulose hybrid material, a paper product or a wood product, with superior dimensional stability and a reduced water-absorbing property. In the present invention, a lignocellulose material is treated with a treatment agent for use in a lignocellulose material containing: (A) a polyvalent carboxylic acid or a derivative thereof; and (B) a silicon compound containing a functional group binding to a silicon atom, and thereby, a lignocellulose hybrid material is obtained. In addition, a paper product or a wood product is obtained by using the aforementioned lignocellulose hybrid material.

10 Claims, No Drawings

TREATMENT AGENT FOR USE IN LIGNOCELLULOSE MATERIAL

TECHNICAL FIELD

The present invention relates to a treatment agent for use in a lignocellulose material. In addition, the present invention also relates to a method for treating a lignocellulose material using the aforementioned treatment agent for use in a lignocellulose material, and a method for producing a paper product or a wood product using the aforementioned lignocellulose material.

This application is the National Stage of International Patent Application No. PCT/JP2011/058467, filed on Mar. 25, 2011, which claims priority to Japanese Patent Application No. 2010-71750, filed on Mar. 26, 2010, the content of which is incorporated herein by reference.

BACKGROUND ART

Heretofore, in order to prevent deformation of wood such as warpage, cracks, warp, expansion and contraction, or the like, caused by drying or moisturizing the wood, a polyethylene glycol (PEG) treatment, a phenol resin-impregnation treatment, an unsaturated polyester resin impregnation treatment (see Japanese Examined Patent Application, Second Publication No. S53-5722), an acetylation treatment and the like are known. However, in the aforementioned treatments, deformation of wood caused by moisture cannot be sufficiently prevented.

On the other hand, Japanese Examined Patent Application, Second Publication No. H05-6481 proposes that a lignocellulose material in which a polyvalent carboxylic acid or a derivative thereof has been impregnated is subjected to a heat treatment, and thereby, a three-dimensional network structure is formed among structural components of the lignocellulose material to improve dimensional stability of a wooden board or the like formed from the aforementioned lignocellulose material.

Japanese Unexamined Patent Application, First Publication No. H07-150131 describes a method for treating wood with a composition containing a basic nitrogen group-containing organopolysiloxane and an organic or inorganic acid salt, a liquid water-repellent substance and water.

Japanese Unexamined Patent Application, First Publication No. 2002-241744 describes an aqueous water-repellent agent for treating a base material, which contains a product produced by subjecting an alkoxy group-containing organosilicon compound and an amino group-containing alkoxysilane or a partially hydrolyzed product thereof to co-hydrolysis-condensation in the presence of an organic acid or an inorganic acid.

DISCLOSURE OF INVENTION

Technical Problems

The inventors of the present invention discovered that in the method described in Japanese Examined Patent Application, Second Publication No. H05-6481, deformation caused by moisture in a wooden board or the like can be ameliorated, but absorption of moisture itself cannot be controlled. There are problems in that it is difficult to use the wooden board or the like which absorbs a large amount of moisture in a kitchen, a bath room or the like, mold easily grows, and dimensional stability of the wooden board caused by freezing in the winter season is degraded.

In addition, in the methods described in Japanese Unexamined Patent Application, First Publication No. H07-150131 or Japanese Unexamined Patent Application, First Publication No. 2002-241744, it can be seen that even if a polyvalent carboxylic acid is used as an organic acid, the polyvalent carboxylic acid and an amino group or a basic nitrogen group form a salt, and for this reason, the deformation caused by moisture in a wooden board or the like cannot be ameliorated, and in addition, water repellency also cannot be sufficiently exhibited.

Therefore, an objective of the present invention is to provide a lignocellulose material exhibiting superior dimensional stability and having a reduced water-absorbing property, as well as provide a paper product or a wood product formed from the aforementioned lignocellulose material.

Technical Solution

The objective of the present invention can be achieved by a treatment agent for use in a lignocellulose material comprising: (A) a polyvalent carboxylic acid or a derivative thereof; and (B) a silicon compound containing a functional group binding to a silicon atom.

The derivative, of the aforementioned polyvalent carboxylic acid can be a carboxylic acid anhydride or a reaction product between a polyhydric alcohol and a polyvalent carboxylic acid.

The aforementioned functional group binding to the silicon atom preferably has at least one group selected from the group consisting of an epoxy group, a carbinol group and a carboxy group.

The aforementioned silicon compound is preferably an organosilane or an organopolysiloxane.

The treatment agent for use in a lignocellulose material of the present invention can further contain a polyhydric alcohol.

The treatment agent for use in a lignocellulose material of the present invention can further contain an esterification catalyst.

The treatment agent for use in a lignocellulose material of the present invention can be in the form of a solution or an emulsion.

The present invention also relates to a lignocellulose hybrid material comprising a lignocellulose material and the aforementioned treatment agent for use in a lignocellulose material, as well as a paper product or a wood product comprising the aforementioned lignocellulose hybrid material.

The aforementioned lignocellulose hybrid material can further contain an organic resin binder.

In particular, a lignocellulose hybrid material, as well as a paper product or a wood product which are objective products of the present invention can be obtained by (1) a method for treating a lignocellulose material comprising the steps of impregnating or applying the aforementioned treatment agent for use in a lignocellulose material to a lignocellulose material;

(2) a method for producing a lignocellulose hybrid material comprising the steps of impregnating or applying the aforementioned treatment agent for use in a lignocellulose material to a lignocellulose material; and (3) a method for producing a paper product or a wood product comprising the steps of impregnating or applying the aforementioned treatment agent for use in a lignocellulose material to a lignocellulose material to produce a lignocellulose hybrid material, and heating the aforementioned lignocellulose hybrid material.

Advantageous Effects of the Invention

In the treatment agent for use in a lignocellulose material of the present invention, an ester bond is formed between the hydroxyl group of the cellulose chain of the lignocellulose material and the carboxy group of a polyvalent carboxylic acid or the derivative thereof, and thereby, the aforementioned cellulose chain is crosslinked to form a three-dimensional network structure among the structural components of the lignocellulose material. Thereby, while deformation of the lignocellulose material is prevented and dimensional stability can be enhanced, moisture-absorbing properties of the lignocellulose material can be reduced by means of the silicon compound containing a functional group binding to the silicon atom.

Therefore, by treating a lignocellulose material with the treatment agent for use in a lignocellulose material of the present invention, a lignocellulose hybrid material exhibiting superior dimensional stability and reduced moisture-absorbing properties can be provided.

In addition, in accordance with the present invention, a paper product or a wood product in which superior dimensional stability is exhibited and moisture-absorbing properties are controlled can be produced.

BEST MODES FOR CARRYING OUT THE INVENTION

The polyvalent carboxylic acid or the derivative thereof of component (A) is a compound which has two or more carboxy groups in a molecule and may contain a hydroxyl group in addition to the aforementioned carboxy groups. The polyvalent carboxylic acid or the derivative thereof of component (A) may be a mixture of two or more types thereof. More particularly, as examples thereof, mention may be made of a divalent carboxylic acid such as oxalic acid, malonic acid, maleic acid, fumaric acid, succinic acid, glutaric acid, adipic acid, phthalic acid, malic acid, tartaric acid or the like; a trivalent carboxylic acid such as trimellitic acid, citric acid or the like; a tetravalent carboxylic acid such as pyromellitic acid, 1,2,3,4-butanetetracarboxylic acid or the like; and a polycarboxylic acid such as an acrylic acid polymer, an acrylic acid copolymer such as a copolymer of acrylic acid and methyl acrylate or the like, a methacrylic acid polymer, a methacrylic acid copolymer such as a copolymer of methacrylic acid and methyl methacrylate or the like. Maleic acid, succinic acid, citric acid or 1,2,3,4-butanetetracarboxylic acid is preferred.

As examples of derivatives of the polyvalent carboxylic acids, mention may be made of an anhydride, a ($C_1$ to $C_{10}$ alkyl) ester, a silyl ester, an amide of the aforementioned polyvalent carboxylic acid, or the like. The anhydride of the polyvalent carboxylic acid is preferred, and in particular, maleic anhydride is preferred.

The derivative of the polyvalent carboxylic acid may be a reaction product between the aforementioned polyvalent carboxylic acid and a polyhydric alcohol. As examples of polyhydric alcohols, mention may be made of a divalent alcohol such as ethylene glycol, diethylene glycol, propylene glycol or the like; a trivalent alcohol such as glycerol (1,2,3-propanetriol), 1,1,1-tris(hydroxymethyl)ethane, 1,1,1-tris(hydroxymethyl)propane or the like; a sugar or a sugar alcohol such as sucrose, glucose, trehalose, pentaerythritol, dipentaerythritol, mannitol or the like; and a polyalcohol such as polyvinyl alcohol or the like. In view of easiness of availability, glycerol is preferred.

The reaction product between the polyvalent carboxylic acid and the polyhydric alcohol is preferably a compound obtained by subjecting the polyvalent carboxylic acid and the polyhydric alcohol to a dehydration condensation reaction in an amount ratio ranging from 1.2 to 3.0 of the carboxylic acid in the polyvalent carboxylic acid with respect to one mol of the hydroxyl group in the polyhydric alcohol. For example, in the case of the reaction product between maleic anhydride and glycerol, a mixture of maleic anhydride and glycerol may be heated and stirred at a temperature which is not lower than the melting point (52.6° C.) of the maleic anhydride.

The silicon compound containing a functional group binding to the silicon atom of component (B) is not particularly restricted as long as the silicon compound has at least one functional group binding to the silicon atom. The aforementioned silicon compound containing a functional group binding to the silicon atom of component (B) may be a mixture of two or more types thereof. As the aforementioned silicon compound, a silane or a polysiloxane is preferred, and an organosilane or an organopolysiloxane is more preferred.

The organosilane is preferably one represented by the following general formula:

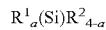

wherein $R^1$ represents a functional group binding to the silicon atom; $R^2$ represents a monovalent hydrocarbon group; and a represents an integer ranging from 1 to 4.

As examples of monovalent hydrocarbon groups, mention may be made of, for example, a linear or branched alkyl group having 1 to 30 carbon atoms such as a methyl group, an ethyl group, a propyl group, a butyl group, a pentyl group, a hexyl group, a heptyl group, an octyl group, a decyl group, a dodecyl group or the like; a cycloalkyl group having 3 to 30 carbon atoms such as a cyclopentyl group, a cyclohexyl group or the like; an alkenyl group having 2 to 30 carbon atoms such as a vinyl group, an allyl group, a butenyl group, a hexenyl group, an octenyl group or the like; an aryl group having 6 to 30 carbon atoms such as a phenyl group, a tolyl group, a xylyl group, a naphthyl group or the like; an aralkyl group having 7 to 30 carbon atoms such as a benzyl group, a phenethyl group or the like; and a substituted group thereof in which hydrogen atoms binding to the carbon atom of the aforementioned group are at least partially substituted by a halogen atom such as a fluorine atom or the like, such as a 3,3,3-trifluoropropyl group, a 3-chloropropyl group or the like. The monovalent hydrocarbon group is preferably a non-substituted monovalent hydrocarbon group having 1 to 30 carbon atoms, more preferably 1 to 6 carbon atoms. A methyl group, an ethyl group or a phenyl group is, in particular, preferred.

The molecular structure of the organopolysiloxane is not particularly restricted. As examples thereof, mention may be made of a linear structure, a branched structure, a linear structure partially having a branched chain, a network structure, a dendrimer structure and the like. The organopolysiloxane having a linear structure or a linear structure partially having a branched chain is preferred. The organopolysiloxane may be a homo polymer or a copolymer, and in addition, may be a mixture of two or more types of polymers.

The viscosity of the organopolysiloxane at 25° C. is not particularly restricted, and the organopolysiloxane may be in the form of a liquid to a semi-solid raw rubber at 25° C. In view of the handling properties, the organopolysiloxane is preferably in the form of a liquid at 25° C., and the kinetic viscosity thereof at 25° C. preferably ranges from 1 to 1,000, 000 mm$^2$/s, more preferably ranges from 5 to 20,000 mm$^2$/s, and, in particular, more preferably ranges from 5 to 10,000 mm$^2$/s. The organopolysiloxane preferably contains one siloxane unit to 10,000 siloxane units, more preferably contains one siloxane unit to 1,000 siloxane units, and most preferably contains two siloxane units to 100 siloxane units in a molecule.

The functional group binding to the silicon atom means a functional group which is bound to a silicon atom, and the types thereof are not particularly restricted. In the present invention, the functional group binding to the silicon atom is not an alkoxy group. The organosilicon compound of the present invention contains no alkoxy group as the functional group binding to the silicon atom, but may contain an alkoxy group as another group. However, the organosilicon compound of the present invention preferably does not contain any alkoxy groups at all. In particular, an alkoxysilane or a partially hydrolyzed product thereof such as a polysilicate or the like exhibits strong hydrophilic properties. For this reason, the lignocellulose material treated with a treating agent containing the aforementioned alkoxysilane or a partially hydrolyzed product thereof may exhibit poor water repellency in some cases.

The functional group binding to the silicon atom is a reactive functional group other than a basic nitrogen-containing group, and is preferably a reactive functional group containing an oxygen atom binding to the carbon atom which reacts with the hydroxyl group of the cellulose in the lignocellulose material in the presence or absence of the polyvalent carboxylic acid. In addition, the functional group binding to the silicon atom preferably does not react with the carbonyl group of component (A) at room temperature during storage. As the aforementioned functional group binding to the silicon atom, a group selected from the group consisting of a carboxy group, an epoxy group, a carbinol group, an acryl group, an amide group, a mercapto group, and a phenol group is preferred. Among these, a carboxy group, an epoxy group and a carbinol group are preferred. The aforementioned groups may directly bind to the silicon atom, or may indirectly bind thereto via the other groups such as a divalent hydrocarbon group, an alkyleneoxyalkylene group and the like.

As examples of divalent hydrocarbon groups, mention may be made of, for example, a straight or branched alkylene group having 1 to 30 carbon atoms such as a methylene group, a dimethylene group, a trimethylene group, a tetramethylene group, a pentamethylene group, a hexamethylene group, a heptamethylene group, an octamethylene group or the like; an arylene group having 6 to 30 carbon atoms such as a phenylene group, a diphenylene group or the like; an alkylene arylene group having 7 to 30 carbon atoms such as a dimethylene phenylene group or the like; and a substituted group thereof in which the hydrogen atoms binding to a carbon atom of the aforementioned groups are at least partially substituted by a halogen atom such as a fluorine group or the like, or an organic group containing an oxyalkylene group or the like. The divalent hydrocarbon group is preferably a non-substituted divalent hydrocarbon group having 1 to 30 carbon atoms, more preferably a linear or branched alkylene group, having 1 to 6 carbon atoms, and in particular, preferably a linear alkylene group having 1 to 6 carbon atoms.

As the group other than the functional group binding to the silicon atom which the organopolysiloxane possesses, the monovalent hydrocarbon group as described above is preferred.

As examples of the aforementioned organopolysiloxanes, mention may be made of a dimethylpolysiloxane in which both terminals of the molecular chain are capped with carboxydecyl groups, a dimethylpolysiloxane in which both terminals of the molecular chain are capped with hydroxyethoxypropyl groups, a dimethylpolysiloxane in which both terminals of the molecular chain are capped with glycidoxypropyl groups, a copolymer of a dimethylsiloxane and a methylepoxycyclohexylethylsiloxane, and the like.

The amount of the silicon compound containing the functional group binding to the silicon atom (B) ranges from 1 part by weight to 10,000 parts by weight, preferably ranges from 5 to 1,000 parts by weight, more preferably ranges from 5 to 300 parts by weight, and most preferably ranges from 10 to 100 parts by weight, with respect to 100 parts by weight of the polyvalent carboxylic acid or the derivative thereof (A). If the amount of the silicon compound containing the functional group binding to the silicon atom (B) with respect to 100 parts by weight of the polyvalent carboxylic acid or the derivative thereof (A) is below one part by weight, no effects of reducing moisture-absorbing properties may be exhibited. On the other hand, if the amount of the silicon compound containing the functional group binding to the silicon atom (B) with respect to 100 parts by weight of the polyvalent carboxylic acid or the derivative thereof (A) exceeds 10,000 parts by weight, there may be disadvantages in view of cost.

The treatment agent for use in a lignocellulose material of the present invention may further contain a polyhydric alcohol. As the polyhydric alcohol, the aforementioned polyhydric alcohols can be used. Two or more types of the polyhydric alcohols may be contained. The blending amount of the polyhydric alcohol is not particularly restricted. The amount of the carboxylic acid group in the polyvalent carboxylic acid or the derivative thereof with respect to one mol of the hydroxyl group in the polyhydric alcohol preferably ranges from 1.2 to 3.0.

The treatment agent for use in a lignocellulose material of the present invention may further contain an esterification catalyst. The type of the esterification catalyst is not particularly restricted. A Lewis acid such as iron (III) chloride, iron (III) sulfate, aluminum sulfate, alum or the like is preferred. Two or more types of esterification catalysts may be contained. The blending amount of the esterification catalyst preferably ranges from 0.1 to 10,000 parts by weight, more preferably ranges from 1 to 1,000 parts by weight, and further preferably ranges from 1 to 300 parts by weight, with respect to 100 parts by weight of the aforementioned polyvalent carboxylic acid or the derivative thereof (A).

The treatment agent for use in a lignocellulose material of the present invention can be prepared by mixing the aforementioned polyvalent carboxylic acid or the derivative thereof (A), the aforementioned silicon compound containing a functional group binding to the silicon atom (B), and further mixing optional components, if necessary. In the case where the aforementioned mixture is in the form of a liquid, the mixture may be used as it is. In particular, in the case where the mixture is in the form of a solid, the solid is dissolved in a specified liquid to form a solution or is dispersed in a specified liquid to form an emulsion, and then the solution or emulsion can be used. As the aforementioned liquid, a liquid possessing strong polarity such as water; an alcohol such as methanol, ethanol or the like; a ketone such as acetone or the like; an ether such as dioxane, tetrahydrofuran or the like; dimethylformamide; or the like is preferred. Water or an alcohol is, in particular, preferred. A mixture of two or more types of liquids may be used. Emulsification of the treatment agent for use in a lignocellulose material of the present invention Can be carried out in accordance with a conventional method. In the case where the treatment agent for use in a lignocellulose material of the present invention is used as an aqueous emulsion, an oil-in-water emulsion of the silicon compound containing a functional group binding to the silicon atom (B) is preliminarily prepared, and then the polyvalent carboxylic acid or the derivative thereof (A) and optional components are preferably blended therein.

The concentration of the aforementioned polyvalent carboxylic acid or the derivative thereof (A) and the aforementioned silicon compound containing a functional group binding to the silicon atom (B) in the treatment agent for use in a lignocellulose material of the present invention is not particularly restricted, and may be 100% by weight. The concentration preferably ranges from 1 to 90% by weight, more preferably ranges from 3 to 80% by weight and further preferably ranges from 5 to 70% by weight.

As examples of the optional components which may be added to the treatment agent for use in a lignocellulose material of the present invention, mention may be made of, for example, perfumes, deodorants, corrosion-resistant agents, flame retardants, antimicrobial agents, bactericides, fungicides, insect repellents, insecticides, antiviral agents, optical screening/optical absorbing agents, dyes, pigments and the like.

In the present invention, by treating a lignocellulose material with the aforementioned treatment agent for use in a lignocellulose material, a lignocellulose hybrid material which exhibits superior dimensional stability and controlled moisture-absorption can be obtained. The lignocellulose material in the present invention is a lignocellulose-based material derived from plants such as raw wood; wood; wood chips; wood fiber; cellulose fiber or the like, and contains paper.

In the present invention, a paper product or a wood product may be produced by using the aforementioned lignocellulose hybrid material. The aforementioned paper product is a product in which paper is used in at least one part, and types thereof are not particularly restricted. For example, the paper product includes various types of indicator paper, cardboard paper, filter paper and the like. The aforementioned wood product is a product in which wood is used in at least one part, and types thereof are not particularly restricted. For example, the wood product includes wooden board. A wooden board means a board made of wood used in a building material such as laminated wood; plywood; OSB (Oriented Strand Board); particle board; fiber board such as insulation board, MDF (Medium Density Fiberboard) or the like; or the like. In particular, the present invention can be suitably applied to modification of paper or preparation of wooden board.

The method of treating a lignocellulose material and a method for producing a lignocellulose hybrid material of the present invention contain the steps of impregnating or applying the aforementioned treatment agent for use in a lignocellulose material to a lignocellulose material.

The method of impregnating or applying the aforementioned treatment agent for use in a lignocellulose material to a lignocellulose material is not particularly restricted. As examples thereof, mention may be made of a method in which a lignocellulose material is immersed in the aforementioned treatment agent for use in a lignocellulose material or in a solution or emulsion thereof under atmospheric pressure or under reduced pressure; a method in which the aforementioned treatment agent for use in a lignocellulose material or a solution or emulsion thereof is applied to the surface of a lignocellulose material by means of spray coating, brush coating, knife coating or the like; a method in which a lignocellulose material and the aforementioned treatment agent for use in a lignocellulose material are placed in a mixer, and the mixture is stirred optionally together with the aforementioned liquid; and the like. In order to effectively carry out the impregnation of the aforementioned treatment agent for use in a lignocellulose material into the lignocellulose material, the aforementioned treatment agent for use in a lignocellulose material and/or the lignocellulose material are/is preferably heated in the aforementioned impregnating or applying step, since heating may accelerate penetration of the treatment agent for use in a lignocellulose material into the lignocellulose material in some cases. The heating temperature at this time is preferably 30° C. or more, but less than 100° C., and is more preferably 60° C. or more, but less than 100° C.

As the usage amount of the aforementioned treatment agent for use in a lignocellulose material, the total amount of the aforementioned polyvalent carboxylic acid or the derivative thereof (A) and the aforementioned silicon compound containing a functional group binding to the silicon atom (B) with respect to the amount of the lignocellulose material preferably ranges from 0.05 to 100% by weight and preferably ranges from 0.1 to 20% by weight.

In order to make the esterification reaction of the aforementioned polyvalent carboxylic acid or the derivative (A) proceed effectively, the aforementioned lignocellulose hybrid material may be heated to a temperature of preferably 100° C. or more, more preferably ranging from 100 to 300° C., and furthermore preferably ranging from 100 to 250° C. If the aforementioned heating step is carried out, a lignocellulose hybrid material which exhibits more superior dimensional stability and exhibits further reduced moisture absorbing properties can be obtained.

In addition, the present invention also relates to a method for producing a paper product or a wood product comprising the steps of impregnating or applying the aforementioned treatment agent for use in a lignocellulose material to a lignocellulose material to obtain a lignocellulose hybrid material, and heating the aforementioned lignocellulose hybrid material.

The impregnation step or application step in the method for producing a paper product or a wood product of the present invention can be carried out in the same manner as described above in the impregnation step or application step in the method for treating a lignocellulose material and in the method for producing a lignocellulose hybrid material exhibiting reduced moisture-absorbing properties. The aforementioned treatment agent for use in a lignocellulose material and an organic resin binder are preferably added while the lignocellulose material such as wood chips, wood fiber or the like is stirred. At the time of adding these, heating may be carried out.

The organic resin binder is a component for adhering lignocellulose materials to each other to form a desirable shape and size. Conventional organic resin binders can be used therefor. More particularly, as examples thereof, mention may be made of a urea resin, a urea-melamine resin, a phenol resin, an isocyanate-based resin and the like. In particular, an isocyanate-based resin is preferred since it exhibits superior water resistance, has increased binding power and widely-ranged curing temperatures, and it can be used even in wood with a high moisture content. Further, there is no concern of formalin diffusion, the resin can be mixed with water, and the resin is in the form of a liquid, and therefore, it exhibits superior operation properties. As examples of the isocyanate-based resins, mention may be made of, for example, pMDI (polymeric Methylene Diphenyl Diisocyanate).

In the heating step in the method for producing a paper product or a wood product of the present invention, in order to make the esterification reaction of the aforementioned polyvalent carboxylic acid or the derivative thereof (A) proceed effectively, the heating temperature is preferably 100° C. or more, more preferably ranges from 100 to 300° C., and furthermore preferably ranges from 100 to 250° C. Preferably, the aforementioned treatment agent for use in a lignocellulose material is stirred so that the treatment agent uniformly reaches the surface of the lignocellulose material such as wood chips, wood fiber or the like, and subsequently, the treatment agent is preferably heated.

In addition, in the case in which the lignocellulose material is in the form of chips, a fiber, a powder or the like, the aforementioned heating step is preferably carried out under pressure. Namely, thermal molding is preferably carried out. As a method for thermal molding, a conventional method can be employed.

In the method for treating a lignocellulose material, a method for producing a lignocellulose hybrid material, and a method for producing a paper product or a wood product of the present invention, the aforementioned polyvalent carboxylic acid or the derivative thereof (A) and the aforementioned silicon compound containing a functional group binding to the silicon atom (B) may be independently impregnated or applied to the lignocellulose material. For example, the aforementioned polyvalent carboxylic acid or the derivative thereof (A) may be impregnated in or applied to a lignocellulose material, and subsequently, the aforementioned silicon compound containing a functional group binding to the silicon atom (B) may be impregnated in or applied to the lignocellulose material. Alternatively, the aforementioned silicon compound containing a functional group binding to the silicon atom (B) may be impregnated in or applied to a lignocellulose material, and subsequently, the aforementioned polyvalent carboxylic acid or the derivative thereof (A) may be impregnated in or applied to the lignocellulose material.

EXAMPLES

Hereinafter, the present invention is described in detail with reference to examples and comparative examples. It should be understood that the present invention is not restricted to the examples.

A coefficient of expansion in thickness and a rate of increase in weight of a filter paper were measured in accordance with a method of JIS A5905. In addition, a coefficient of expansion in thickness and a rate of increase in weight of a wooden board were measured in accordance with a method of ASTM D1037-06a. A kinetic viscosity is a value measured at 25° C., and % means % by weight.

Example 1

0.012 g of maleic anhydride, 0.003 g of glycerol, and 0.015 g of a polydimethylsiloxane of which both terminals of the molecular chain are capped with carboxydecyl groups (kinetic viscosity=150 mm$^2$/s) were dissolved in 7.5 g of acetone. A filter paper (No. 424, thickness=1 mm, diameter=110 mm Ø, manufactured by Advantec Toyo Kaisha Ltd.) was immersed in the obtained solution together with 1 g of a 1% aqueous solution of iron (III) chloride, followed by drying by air and subjecting to a heat treatment for 10 minutes in an oven at 150° C. The aforementioned filter paper was immersed in water for 18 hours at room temperature. A coefficient of expansion in thickness and a rate of increase in weight of the aforementioned filter paper, obtained by comparing the thicknesses before and after the filter paper was immersed in water, were respectively 21.3% and 94%.

Example 2

0.012 g of maleic anhydride, 0.003 g of glycerol, and 0.015 g of a polydimethylsiloxane of which both terminals of the molecular chain are capped with hydroxyethoxypropyl groups (kinetic viscosity=60 mm$^2$/s) were dissolved in 7.5 g of acetone. A filter paper (No. 424, thickness=1 mm, diameter=110 mm Ø, manufactured by Advantec Toyo Kaisha Ltd.) was immersed in the obtained solution together with 1 g of a 1% aqueous solution of iron (III) chloride, followed by drying by air and subjecting to a heat treatment for 10 minutes in an oven at 150° C. The aforementioned filter paper was immersed in water for 18 hours at room temperature. A coefficient of expansion in thickness and a rate of increase in weight of the aforementioned filter paper, obtained by comparing the thicknesses before and after the filter paper was immersed in water, were respectively 18.3% and 82%.

Example 3

0.012 g of maleic anhydride, 0.003 g of glycerol, and 0.015 g of a polydimethylsiloxane of which both terminals of the molecular chain are capped with glycidoxypropyl groups (kinetic viscosity=10 mm$^2$/s) were dissolved in 7.5 g of acetone. A filter paper (No. 424, thickness=1 mm, diameter=110 mm Ø, manufactured by Advantec Toyo Kaisha Ltd.) was immersed in the obtained solution together with 1 g of a 1% aqueous solution of iron (III) chloride, followed by drying by air and subjecting to a heat treatment for 10 minutes in an oven at 150° C. The aforementioned filter paper was immersed in water for 18 hours at room temperature. A coefficient of expansion in thickness and a rate of increase in weight of the aforementioned filter paper, obtained by comparing the thickness before and after the filter paper was immersed in water, were respectively 21.0% and 71%.

Example 4

0.0105 g of 1,2,3,4-butanetetracarboxylic acid, 0.0045 g of glycerol, and 0.015 g of a polydimethylsiloxane of which both terminals of the molecular chain are capped with carboxydecyl groups (kinetic viscosity=150 mm$^2$/s) were dissolved in 7.5 g of acetone. A filter paper (No. 424, thickness=1 mm, diameter=110 mm Ø, manufactured by Advantec Toyo Kaisha Ltd.) was immersed in the obtained solution together with 1 g of a 1% aqueous solution of iron (III) chloride, followed by drying by air and subjecting to a heat treatment for 10 minutes in an oven at 150° C. The aforementioned filter paper was immersed in water for 18 hours at room temperature. A coefficient of expansion in thickness and a rate of increase in weight of the aforementioned filter paper, obtained by comparing the thickness before and after the filter paper was immersed in water, were respectively 16.8% and 75%.

Example 5

0.0105 g of 1,2,3,4-butanetetracarboxylic acid, and 0.015 g of a polydimethylsiloxane of which both terminals of the molecular chain are capped with carboxydecyl groups (kinetic viscosity=150 mm$^2$/s) were dissolved in 7.5 g of acetone. A filter paper (No. 424, thickness=1 mm, diameter=110 mm Ø, manufactured by Advantec Toyo Kaisha Ltd.) was immersed in the obtained solution together with 1 g of a 1% aqueous solution of iron (III) chloride, followed by drying by air and subjecting to a heat treatment for 10 minutes in an oven at 150° C. The aforementioned filter paper was immersed in water for 18 hours at room temperature. A coefficient of expansion in thickness and a rate of increase in weight of the aforementioned filter paper, obtained by comparing the thickness before and after the filter paper was immersed in water, were respectively 18.2% and 94%.

Example 6

0.0105 g of 1,2,3,4-butanetetracarboxylic acid, and 0.015 g of a polydimethylsiloxane of which both terminals of the molecular chain are capped with hydroxyethoxypropyl groups (kinetic viscosity=60 mm$^2$/s) were dissolved in 7.5 g of acetone. A filter paper (No. 424, thickness=1 mm, diameter=110 mm Ø, manufactured by Advantec Toyo Kaisha Ltd.) was immersed in the obtained solution together with 1 g of a 1% aqueous solution of iron (III) chloride, followed by drying by air and subjecting to a heat treatment for 10 minutes in an oven at 150° C. The aforementioned filter paper was immersed in water for 18 hours at room temperature. A coefficient of expansion in thickness and a rate of increase in weight of the aforementioned filter paper, obtained by comparing the thickness before and after the filter paper was immersed in water, were respectively 19.1% and 87%.

Example 7

0.0150 g of 1,2,3,4-butanetetracarboxylic acid, and 0.015 g of a polydimethylsiloxane of which both terminals of the molecular chain are capped with carboxydecyl groups (kinetic viscosity=150 mm$^2$/s) were dissolved in 7.5 g of acetone. A filter paper (No. 424, thickness=1 mm, diameter=110 mm Ø, manufactured by Advantec Toyo Kaisha Ltd.) was immersed in the obtained solution together with 1 g of a 1% aqueous solution of iron (III) chloride, followed by drying by air and subjecting to a heat treatment for 10 minutes in an oven at 150° C. The aforementioned filter paper was immersed in water for 18 hours at room temperature. A coefficient of expansion in thickness and a rate of increase in weight of the aforementioned filter paper, obtained by comparing the thickness before and after the filter paper was immersed in water, were respectively 18.1% and 95%.

Comparative Example 1

A filter paper (No. 424, thickness=1 mm, diameter=110 mm Ø, manufactured by Advantec Toyo Kaisha Ltd.) was immersed in water for 18 hours at room temperature. A coefficient of expansion in thickness and a rate of increase in weight of the aforementioned filter paper, obtained by comparing the thickness before and after the filter paper was immersed in water, were respectively 32.4% and 314%.

Comparative Example 2

32.0 g of maleic anhydride and 8.0 g of glycerol were heated and stirred at 65° C. or more. After a uniform liquid of the reaction mixture was obtained, the liquid of the reaction mixture was further heated and stirred for one hour. Thereby, a colorless transparent product (which was in the form of a solid at room temperature, while in the form of a liquid at the time of the preparation), in an amount of 39.8 g, was obtained. The obtained reaction product, in an amount of 0.015 g, was dissolved in 7.5 g of acetone. A filter paper (No. 424, thickness=1 mm, diameter=110 mm Ø, manufactured by Advantec Toyo Kaisha Ltd.) was immersed in the obtained solution together with 1 g of a 1% aqueous solution of iron (III) chloride, followed by drying by air and subjecting to a heat treatment for 10 minutes in an oven at 150° C. The aforementioned filter paper was immersed in water for 18 hours at room temperature. A coefficient of expansion in thickness and a rate of increase in weight of the aforementioned filter paper, obtained by comparing the thickness before and after the filter paper was immersed in water, were respectively 21.0% and 266%.

Comparative Example 3

0.012 g of maleic anhydride and 0.003 g of glycerol were dissolved in 7.5 g of acetone. A filter paper (No. 424, thickness=1 mm, diameter=110 mm Ø, manufactured by Advantec Toyo Kaisha Ltd.) was immersed in the obtained solution together with 1 g of a 1% aqueous solution of iron (III) chloride, followed by drying by air and subjecting to a heat treatment for 10 minutes in an oven at 150° C. The aforementioned filter paper was immersed in water for 18 hours at room temperature. A coefficient of expansion in thickness and a rate of increase in weight of the aforementioned filter paper, obtained by comparing the thickness before and after the filter paper was immersed in water, were respectively 22.2% and 261%.

Comparative Example 4

0.012 g of maleic acid and 0.003 g of glycerol were dissolved in 7.5 g of acetone. A filter paper (No. 424, thickness=1 mm, diameter=110 mm Ø, manufactured by Advantec Toyo Kaisha Ltd.) was immersed in the obtained solution together with 1 g of a 1% aqueous solution of iron (III) chloride, followed by drying by air and subjecting to a heat treatment for 10 minutes in an oven at 150° C. The aforementioned filter paper was immersed in water for 18 hours at room temperature. A coefficient of expansion in thickness and a rate of increase in weight of the aforementioned filter paper, obtained by comparing the thickness before and after the filter paper was immersed in water, were respectively 22.0% and 264%.

Comparative Example 5

0.012 g of maleic anhydride, 0.003 g of glycerol, and 0.015 g of a polydimethylsiloxane of which both terminals of the molecular chain are capped with trimethylsiloxy groups (kinetic viscosity=10 mm$^2$/s) were dissolved in 7.5 g of acetone. A filter paper (No. 424, thickness=1 mm, diameter=110 mm Ø, manufactured by Advantec Toyo Kaisha Ltd.) was immersed in the obtained solution together with 1 g of a 1% aqueous solution of iron (III) chloride, followed by drying by air and subjecting to a heat treatment for 10 minutes in an oven at 150° C. The aforementioned filter paper was immersed in water for 18 hours at room temperature. A coefficient of expansion in thickness and a rate of increase in weight of the aforementioned filter paper, obtained by comparing the thicknesses before and after the filter paper was immersed in water, were respectively 22.8% and 245%.

Comparative Example 6

0.012 g of maleic anhydride, 0.003 g of glycerol, and 0.015 g of methyl silicate (manufactured by Tama Chemicals Co., Ltd.) were dissolved in 7.5 g of acetone. A filter paper (No. 424, thickness=1 mm, diameter=110 mm Ø, manufactured by Advantec Toyo Kaisha Ltd.) was immersed in the obtained solution together with 1 g of a 1% aqueous solution of iron (III) chloride, followed by drying by air and subjecting to a heat treatment for 10 minutes in an oven at 150° C. The aforementioned filter paper was immersed in water for 18 hours at room temperature. A coefficient of expansion in thickness and a rate of increase in weight of the aforementioned filter paper, obtained by comparing the thicknesses before and after the filter paper was immersed in water, were respectively 22.5% and 242%.

Comparative Example 7

0.012 g of maleic anhydride, 0.003 g of glycerol, and 0.015 g of silicate 40 (manufactured by Tama Chemicals Co., Ltd.) were dissolved in 7.5 g of acetone. A filter paper (No. 424, thickness=1 mm, diameter=110 mm Ø, manufactured by Advantec Toyo Kaisha Ltd.) was immersed in the obtained solution together with 1 g of a 1% aqueous solution of iron (III) chloride, followed by drying by air and subjecting to a heat treatment for 10 minutes in an oven at 150° C. The aforementioned filter paper was immersed in water for 18 hours at room temperature. A coefficient of expansion in thickness and a rate of increase in weight of the aforementioned filter paper, obtained by comparing the thicknesses before and after the filter paper was immersed in water, were respectively 22.5% and 212%.

In Examples 1 to 8, the filter paper did not easily absorb water, as compared with Comparative Example 1 in which the filter paper was untreated, Comparative Examples 2 to 4 in which a treatment with the polyvalent carboxylic acid or with the polyvalent carboxylic acid and the polyhydric alcohol or with the reaction product thereof was carried out, and Comparative Examples 5 to 7 in which a treatment with the dimethylpolysiloxane containing no functional group binding to the silicon atom, or with the partially-hydrolyzed condensate of the alkoxysilane was carried out. For this reason, in Examples 1 to 8, expansion of the filter paper and increase in weight of the filter paper were controlled.

Example 8

1.22 g of maleic acid and 0.26 g of glycerol were dissolved in 7.08 g of water. 3.21 g of an oil-in-water emulsion containing 40% of a copolymer of dimethylsiloxane and methylepoxycyclohexylethylsiloxane (content of an epoxy group=1.2%, and kinetic viscosity=6,000 mm$^2$/s) was mixed therewith. The obtained solution was added by spraying to 300 g of wood chips, and 15 g of pMDI (Mondur 541, manufactured by Bayer Ltd.) was added thereto, followed by mixing them. The treated wood chips which were sufficiently mixed were pressed for 5 minutes at 200° C. under the pressure of 3.4 MPa. Thereby, a wooden board was obtained. The obtained wooden board was immersed in water for 24 hours at room temperature. A coefficient of expansion in thickness and a rate of increase in weight of the aforementioned wooden board, obtained by comparing the thicknesses before and after the wooden board was immersed in water, were respectively 15.7% and 31.6%.

Example 9

1.22 g of maleic acid and 0.26 g of glycerol were dissolved in 6.03 g of water. 1.91 g of an aqueous solution of 45% by weight of iron (III) chloride (containing 0.86 g of iron (III) chloride and 1.05 g of water), and 3.21 g of an oil-in-water emulsion containing 40% of a copolymer of dimethylsiloxane and methylepoxycyclohexylethylsiloxane (content of an epoxy group=1.2%, and kinetic viscosity=6,000 mm$^2$/s) were mixed therewith. The obtained solution was added to 300 g of wood chips, and 15 g of pMDI (Mondur 541, manufactured by Bayer Ltd.) was added thereto, followed by mixing them. The treated wood chips which were sufficiently mixed were pressed for 5 minutes at 200° C. under the pressure of 3.4 MPa. Thereby, a wooden board was obtained. The obtained wooden board was immersed in water for 24 hours at room temperature. A coefficient of expansion in thickness and a rate of increase in weight of the aforementioned wooden board, obtained by comparing the thicknesses before and after the wooden board was immersed in water, were respectively 15.8% and 38.6%.

Example 10

1.22 g of maleic acid and 0.26 g of glycerol were dissolved in 6.03 g of water. 1.91 g of an aqueous solution of 45% by weight of iron (III) chloride (containing 0.86 g of iron (III) chloride and 1.05 g of water), and 3.21 g of an oil-in-water emulsion containing 40% of a copolymer of dimethylsiloxane and methylepoxycyclohexylethylsiloxane (content of an epoxy group=1.2%, and kinetic viscosity=6,000 mm$^2$/s) were mixed therewith. The obtained solution was added to 300 g of wood chips, and 15 g of pMDI (Mondur 541, manufactured by Bayer Ltd.) was added thereto, followed by mixing them. The treated wood chips which were sufficiently mixed were pressed for 10 minutes at 150° C. under the pressure of 3.4 MPa. Thereby, a wooden board was obtained. The obtained wooden board was immersed in water for 24 hours at room temperature. A coefficient of expansion in thickness and a rate of increase in weight of the aforementioned wooden board, obtained by comparing the thicknesses before and after the wooden board was immersed in water, were respectively 17.7% and 46.4%.

Example 11

1.22 g of maleic acid and 0.26 g of glycerol were dissolved in 7.95 g of water. 1.91 g of an aqueous solution of 45% by weight of iron (III) chloride (containing 0.86 g of iron (III) chloride and 1.05 g of water) was added thereto. The obtained solution was added to 300 g of wood chips, and a mixed liquid of 15 g of pMDI (Mondur 541, manufactured by Bayer Ltd.) and 1.29 g of a polydimethylsiloxane of which both terminals of the molecular chain are capped with glycidoxypropyl groups (kinetic viscosity=10 mm$^2$/s) was added thereto, and the mixture was mixed. The treated wood chips which were sufficiently mixed were pressed for 5 minutes at 200° C. under the pressure of 3.4 MPa. Thereby, a wooden board was obtained. The obtained wooden board was immersed in water for 24 hours at room temperature. A coefficient of expansion in thickness and a rate of increase in weight of the aforementioned wooden board, obtained by comparing the thicknesses before and after the wooden board was immersed in water, were respectively 14.9% and 58.6%.

Example 12

1.22 g of maleic acid and 0.26 g of glycerol were dissolved in 7.95 g of water. 1.91 g of an aqueous solution of 45% by weight of iron (III) chloride (containing 0.86 g of iron (III) chloride and 1.05 g of water) was added thereto. The obtained solution was added to 300 g of wood chips, and a mixed liquid of 15 g of pMDI (Mondur 541, manufactured by Bayer Ltd.) and 1.29 g of a polydimethylsiloxane of which both terminals of the molecular chain are capped with hydroxyethoxypropyl groups (kinetic viscosity=45 mm$^2$/s) was added thereto, and the mixture was mixed. The treated wood chips which were sufficiently mixed were pressed for 5 minutes at 200° C. under the pressure of 3.4 MPa. Thereby, a wooden board was obtained. The obtained wooden board was immersed in water for 24 hours at room temperature. A coefficient of expansion in thickness and a rate of increase in weight of the aforementioned wooden board, obtained by comparing the thicknesses before and after the wooden board was immersed in water, were respectively 15.6% and 36.8%.

Comparative Example 8

15 g of pMDI (Mondur 541, manufactured by Bayer Ltd.) was added to 300 g of wood chips. The treated wood chips which were sufficiently mixed were pressed for 10 minutes at 150° C. under the pressure of 3.4 MPa. Thereby, a wooden board was obtained. The obtained wooden board was immersed in water for 24 hours at room temperature. A coefficient of expansion in thickness and a rate of increase in weight of the aforementioned wooden board, obtained by comparing the thicknesses before and after the wooden board was immersed in water, were respectively 20.5% and 95.0%.

In Examples 8 to 12, the wooden board did not easily absorb water, as compared with Comparative Example 8 which is an untreated wooden board, and for this reason, expansion and increase in weight of the wooden board can be controlled.

The invention claimed is:

1. A treatment agent for use in a lignocellulose material, said treatment agent comprising:
   (A) a polyvalent carboxylic acid or a derivative thereof, wherein said derivative of said polyvalent carboxylic acid is a carboxylic acid anhydride or a reaction product of a polyvalent carboxylic acid and a polyhydric alcohol; and
   (B) an organosilane containing a functional group binding to a silicon atom, wherein said functional group binding to the silicon atom has at least one group selected from the group consisting of a carboxy group, an epoxy group, a carbinol group, an acryl group, an amide group, a mercapto group, and a phenol group.

2. The treatment agent for use in a lignocellulose material according to claim 1, further comprising a polyhydric alcohol.

3. The treatment agent for use in a lignocellulose material according to claim 1, further comprising an esterification catalyst.

4. The treatment agent for use in a lignocellulose material according to claim 1, which is in the form of a solution or an emulsion.

5. A lignocellulose hybrid material comprising the treatment agent for use in a lignocellulose material as recited in claim 1, and a lignocellulose material.

6. The lignocellulose hybrid material according to claim 5, further comprising an organic resin binder.

7. A paper product or a wood product comprising the lignocellulose hybrid material as recited in claim 5.

8. A method for treating a lignocellulose material comprising the steps of impregnating or applying the treatment agent for use in a lignocellulose material as recited in claim 1 to the lignocellulose material.

9. A method for producing a lignocellulose hybrid material comprising the steps of impregnating or applying the treatment agent for use in a lignocellulose material as recited in claim 1 to a lignocellulose material.

10. A method for producing a paper product or a wood product comprising the steps of:
   impregnating or applying the treatment agent for use in a lignocellulose material as recited in claim 1 to a lignocellulose material; and
   heating the lignocellulose material.

* * * * *